United States Patent
Gohain et al.

(10) Patent No.: US 12,061,819 B2
(45) Date of Patent: Aug. 13, 2024

(54) MANAGING SINGLE-LEVEL AND MULTI-LEVEL PROGRAMMING OPERATIONS

(71) Applicant: Micron Technology, Inc., Boise, ID (US)

(72) Inventors: Nitul Gohain, Bangalore (IN); Jameer Mulani, Bangalore (IN); Jotiba Koparde, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 173 days.

(21) Appl. No.: 17/457,829

(22) Filed: Dec. 6, 2021

(65) Prior Publication Data

US 2023/0176778 A1 Jun. 8, 2023

(51) Int. Cl.
*G06F 3/06* (2006.01)

(52) U.S. Cl.
CPC .......... *G06F 3/0659* (2013.01); *G06F 3/061* (2013.01); *G06F 3/0667* (2013.01); *G06F 3/0673* (2013.01)

(58) Field of Classification Search
CPC ...... G06F 3/061; G06F 3/0659; G06F 3/0667; G06F 3/0673
USPC ....................................................... 711/154
See application file for complete search history.

(56) References Cited

U.S. PATENT DOCUMENTS

| | | | | |
|---|---|---|---|---|
| 8,886,877 B1* | 11/2014 | Avila | ............... | G06F 12/0246 711/E12.008 |
| 2016/0070507 A1* | 3/2016 | Hoshikawa | ........... | G06F 3/0644 711/149 |
| 2016/0092129 A1* | 3/2016 | Agarwal | ............ | G11C 29/4401 714/764 |
| 2017/0131904 A1* | 5/2017 | Rajwade | ............... | G06F 3/0673 |
| 2017/0315867 A1* | 11/2017 | Yang | .................. | G06F 11/1072 |
| 2019/0179698 A1* | 6/2019 | Liu | ........................ | G06F 3/0679 |
| 2020/0133585 A1* | 4/2020 | Muchherla | ............ | G06F 3/0673 |
| 2020/0387447 A1* | 12/2020 | Byun | ........................ | G06N 5/04 |
| 2020/0393994 A1* | 12/2020 | Subbarao | ................ | G06F 3/061 |
| 2021/0073119 A1* | 3/2021 | Amaki | .................... | G06F 3/0613 |
| 2021/0124488 A1* | 4/2021 | Stoica | ...................... | G06F 3/061 |
| 2021/0303185 A1* | 9/2021 | Mishra | .................... | G06F 3/0631 |
| 2021/0405900 A1* | 12/2021 | Kurita | .................... | G06F 3/0644 |
| 2022/0300198 A1* | 9/2022 | Gao | ........................ | G06F 11/3466 |
| 2022/0319622 A1* | 10/2022 | Bhardwaj | ............ | G11C 29/765 |
| 2023/0010632 A1* | 1/2023 | Pletka | ................... | G06F 3/0604 |

\* cited by examiner

*Primary Examiner* — Reginald G Bragdon
*Assistant Examiner* — Aaron D Ho
(74) *Attorney, Agent, or Firm* — Holland & Hart LLP

(57) ABSTRACT

Methods, systems, and devices for managing single-level and multi-level programming operations are described. During a first duration, a first set of resources of a memory system may be configured for single-level operations and a second set of resources of a memory system may be configured to multi-level operations. Also, during the first duration, a first set of data may be received and written to a first virtual block that spans the first set of resources in accordance with a single-level programming operation. Additionally, during the first duration, a second set of data may be transferred from the first set of resources or the second set of resources to a second virtual block that spans the second set of resources in accordance with a multi-level programming operation.

20 Claims, 9 Drawing Sheets

MANAGING SINGLE-LEVEL AND MULTI-LEVEL PROGRAMMING OPERATIONS

FIELD OF TECHNOLOGY

The following relates generally to one or more systems for memory and more specifically to managing single-level and multi-level programming operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
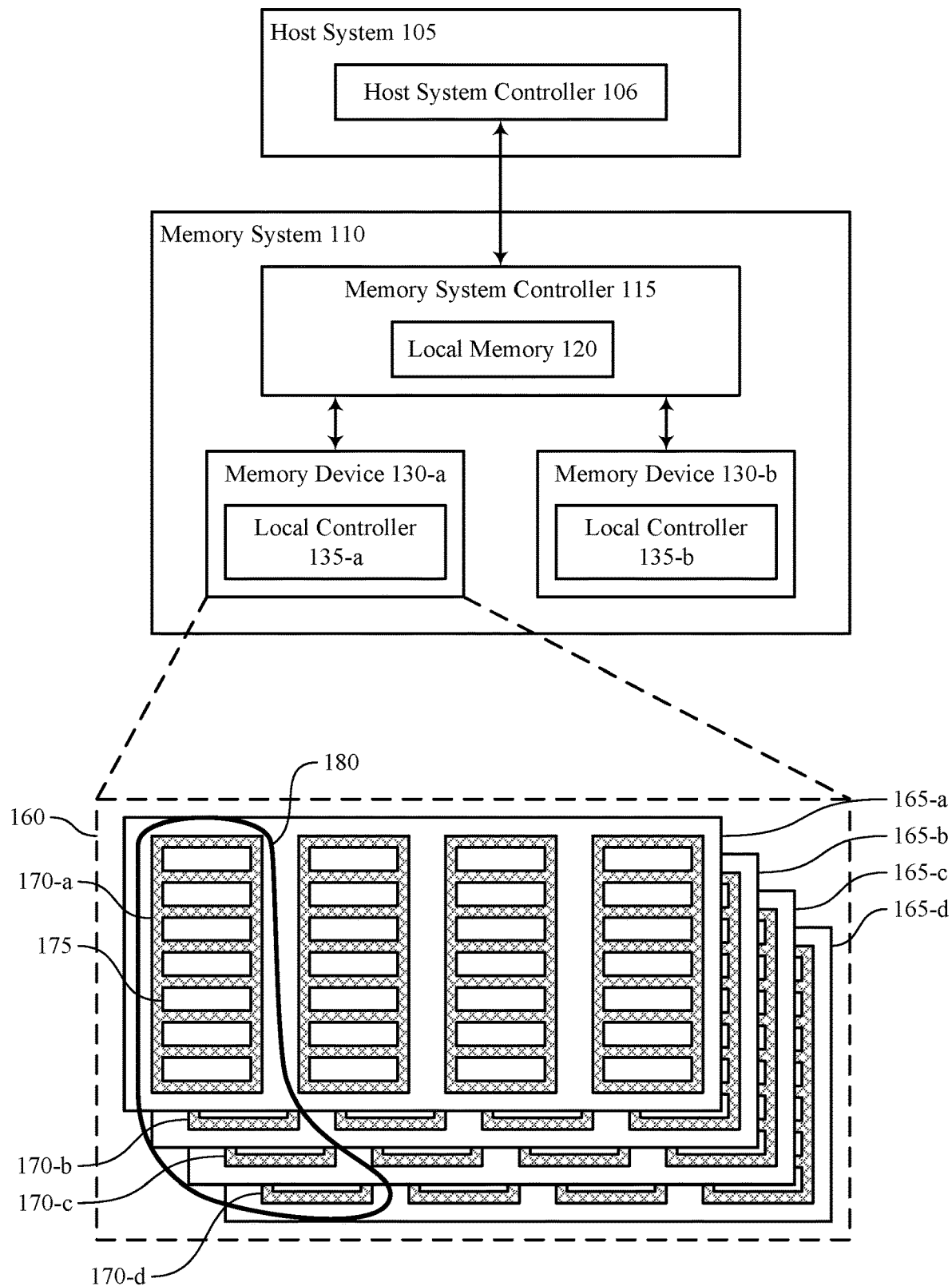
FIG. 1 illustrates an example of a system that supports managing single-level and multi-level programming operations in accordance with examples as disclosed herein.

A memory system may include one or more memory devices having memory cells that can each be used either to store a single bit of data or multiple bits of data, depending on whether an operation for programming a single bit of data is used (which may be referred to as a single-level programming operation) or an operation for programming multiple bits of data (which may be referred to as a multi-level programming operation) is used. A duration for performing single-level operations (e.g., programming or read operations) may be shorter than a duration for performing corresponding multi-level operations. In some examples, the memory system may be configured to store data received from a host system into memory cells of a memory device using single-level operations—e.g., to quickly complete the execution of commands received from the host system. Throughout operation, the memory system may also be configured to transfer data from the single-level programmed memory cells operations into available memory cells using multi-level operations (which may be referred to as a folding operation)—e.g., to restore, in combination with garbage collection, an availability of the single-level programmed memory cells for subsequent programming operations. In some examples, resources in a memory system (e.g., a memory die or a plane in a memory die) may not be accessed by concurrent single-level and multi-level operations. Thus, the memory system may perform the multi-level operations (e.g., folding operation) during an idle period to avoid delaying scheduled single-level operations.

However, in some examples, a memory system may be unable to delay multi-level operations until an idle period occurs. In such cases, a controller may be unable to perform scheduled single-level operations until a current pass of an ongoing multi-level operation is completed. Accordingly, the performance of single-level access operations scheduled to execute commands received from a host system may be delayed. In some examples, the delay may cause the host system to experience longer than expected intervals for the completion of commands transmitted to a memory system. Thus, the host system may be exposed to the high latency of multi-level access operations. In such cases, commands output by the host system may not be processed by the memory system as quickly as desired, which may decrease a performance of the host system, cause processing failures at the host system, decrease a user experience of the host system, or any combination thereof.

To insulate a host system from the latency of multi-level access operations while still enabling multi-level access operations to be performed, resources in a memory system (e.g., memory devices, memory dies, planes, etc.) may be grouped so that one group of the resources may be continuously used for single-level access operation and another group of the resources may be continuously used for multi-level access operations. In some examples, the grouping of the resources occurs when a memory system including the resources enters a different operating mode—e.g., based on a utilization of a capacity of the memory system exceeding a threshold.

Features of the disclosure are initially described in the context of systems, devices, and circuits. Features of the disclosure are also described in the context of subsystems, process flows, and operational diagrams. These and other features of the disclosure are further illustrated by and described in the context of an apparatus diagram and flowchart that relate to managing single-level and multi-level programming operations.

FIG. 1 illustrates an example of a system 100 that supports managing single-level and multi-level programming operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random-access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single-level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165 *c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support managing single-level and multi-level programming operations. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

A memory device 130 may include cells that can be programmed between two states and, thus, may be used to store a bit of information (e.g., a "0" or "1"). Such a cell may be referred to as a single-level cell. Additionally, or alternatively, a memory device 130 may include cells that can be programmed between multiple states (e.g., four states, eight states, sixteen states, etc.) and, thus, may be used to store multiple bits of information (e.g., "00", "01", etc. for a cell that can be programmed into four states). Such a cell may be referred to as a multi-level cell. In some examples, a cell that is used to store four bits of information may be referred to as a quad-level cell (QLC).

Different techniques may be used to access different types of cells. For example, a single-level programming technique may be used to program single-level cells and a multi-level programming technique may be used to program multi-level cells. In some examples, a duration for completing a single-level access technique may be shorter than a duration for completing a multi-level access technique. In some examples, a single-level access technique may be completed in a single pass and a multi-level access technique may be completed in multiple (e.g., two) passes. In some examples, multi-level cells may be operated in different modes—e.g., a single-level mode or a multi-level mode. In such cases, single-level access techniques (the same as or different than the single-level access techniques used to access single-level cells) or multi-level access techniques may be used to access a multi-level cell, where a duration of the single-level access techniques may be shorter than a duration of the multi-level access techniques. For example, a duration for completing a single-level access operation may be around 130 microseconds while a duration for completing a first pass of a multi-level access operation may be around three (3) milliseconds and a second pass of a multi-level access operation may be around seven (7) milliseconds.

A memory device 130 may include multi-level cells, where a portion of the multi-level cells may be programmed using single-level access techniques (e.g., may be operated as a cache) and another portion of the multi-level cells may be programmed using multi-level access techniques (e.g., may be operated as a main memory). Data written to the multi-level cells that are operated as a cache may be transferred (e.g., rewritten) to available multi-level cells that are operated as a main memory. Operations for writing data from multi-level cells that are being used as a cache to multi-level cells that are being used as a main memory may be referred to as "folding operations." In some examples, the multi-level cells may be distributed across one or more planes 165.

Memory system controller 115 may access cells in memory devices 130 based on commands received from host system controller 106. To improve access performance, memory system controller 115 may use sequential programming and read operations to access memory devices 130, and similarly, local controllers 135 may use sequential programming and read operations to access respective memory devices. While performing a sequential programming operation, a controller may program a set of data to a virtual block that is spread across multiple planes 165 and/or memory devices 130. Similarly, the controller may read a set of data from a virtual block that is spread across multiple planes 165 and/or memory devices 130.

Host system controller 106 may expect memory system controller 115 to execute transmitted commands within a duration. For example, host system controller 106 may expect memory system controller 115 to complete programming operations within one (1) millisecond. When data is accessed at memory devices 130 using single-level access techniques in response to commands received from host system 105, the host system 105 may be exposed to the latency of the single-level access operations (e.g., around 130 microseconds for a programming operation).

In some examples, only one of single-level access techniques or multi-level access techniques may be used to access the multi-level cells in a memory device 130, virtual block 180, or plane 165 at a time. For example, a controller (e.g., memory system controller 115 or a local controller 135) may be unable to program a multi-level cell in a memory device 130 using a single-level technique while a folding operation for the memory device 130 is ongoing. Accordingly, the host system 105 may be exposed to the latency of multi-level operations—e.g., if single-level operations scheduled to execute commands from the host system 105 are delayed until the completion of the multi-level access operations. To avoid exposing the host system 105 to the high latency of the multi-level access operations, a memory system 110 may schedule and perform folding operations while a memory system 110 or memory device 130 is in an idle state.

However, in some examples, a memory system 110 may be unable to delay the performance of folding operations until an idle period occurs—e.g., if a utilization of the memory system 110 or memory device 130 exceeds a threshold and folding can be used to free up space in the memory system 110 or memory device 130. In such cases, a controller may be unable to perform single-level operations scheduled for the planes 165 and/or memory devices 130 until a current pass of the folding operation is completed. Accordingly, the performance of single-level access operations scheduled to satisfy commands received from a host system controller 106 may be delayed. In some examples, the delay may cause the host system controller 106 to experience longer than expected delays for the completion of commands transmitted to the memory system controller 115. That is, the host system controller 106 may be exposed to the high access latency of multi-level access operations. In such cases, the host system controller 106 may be unable to transmit commands to the memory system 110 as quickly as desired, which may decrease a performance of the host system, a user experience of the host system, or both.

To insulate a host system from the latency of multi-level access operations while still enabling multi-level access operations to be performed, resources in a memory system (e.g., memory devices, memory dies, planes, etc.) may be grouped so that one group of the resources may be continuously used for single-level access operation and another group of the resources may be continuously used for multi-level access operations. In some examples, the grouping of the resources occurs when a memory system including the resources enters a different operating mode—e.g., based on a utilization of a capacity of the memory system exceeding a threshold.

In some examples, a controller (e.g., host system controller 106, memory system controller 115, or local controller 135-a) may configure, during a first duration, a first set of resources (e.g., a first set of memory devices, which may also be referred to as dies, or a first set of planes) for single-level operations and a second set of resources (e.g., a second set of memory devices or a second set of planes) for multi-level operations. In some examples, the first duration begins based on the controller detecting that a utilization of the resources has exceeded a threshold. During the first duration, the controller may receive and write a first set of data to a first virtual block that spans the first set of resources in accordance with a single-level programming operation. Also, during the first duration, the controller may transfer data from either the first set of resources or from within the second set of resources to a second virtual block that spans the second set of resources in accordance with a multi-level programming operation.

By configuring the first set of resources for single-level operations and the second set of resources for multi-level operations, a controller may prevent a host system from being exposed to the increased duration for executing multi-level operations—e.g., by enabling the memory system to use the first set of resources to continuously execute commands received from the host system in accordance with single-level operations while concurrently using the second set of resources to perform multi-level operations (such as folding operations) to increase an amount of available resources within the memory system.

Figure 2A:
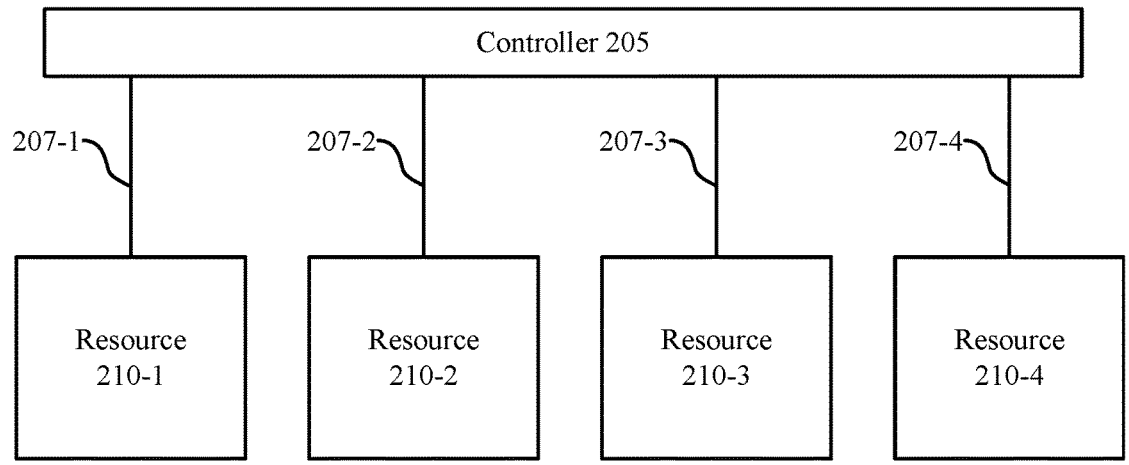
FIGS. 2A and 2B illustrate an example of a subsystem that supports managing single-level and multi-level programming operations in accordance with examples as disclosed herein.

FIG. 2A illustrates an example of a subsystem that supports managing single-level and multi-level programming operations in accordance with examples as disclosed herein.

Illustrates a subsystem that supports managing single-level and multi-level programming operations in accordance with examples as described herein.

Subsystem 200 depicts aspects of a memory system including controller 205, connections 207, and resources 210. Controller 205 may be an example of a host system controller, a memory system controller, or a local controller, as described with reference to FIG. 1. Controller 205 may be connected to resources 210 via connections 207. Controller 205 may be connected to resources 210 via respective connections 207 (which may also be referred to as channels). That is, a separate connection may be present between controller 205 and each of the resources 210. Accordingly, controller 205 may simultaneously communicate (e.g., exchange commands/data) with each of the resources 210. Each of the connections 207 may use a flash protocol (e.g., an open NAND flash interface (ONFI) protocol).

Resources 210 may each include NAND memory cells. At least a portion (e.g., a subset or all) of the NAND memory cells may be multi-level cells. For example, each of the NAND memory cells may be QLCs. In some examples, the NAND memory cells in resources 210 may be accessed (e.g., programmed or read) in accordance with a single-level mode or a multi-level mode. Memory cells within resources 210 may be partitioned into planes, blocks, and pages. In some examples, each of the resources 210 is a separate die. In some examples, each of the resources 210 is a plane. When each of the resources 210 is a plane, a single die may include each of the resources 210 (e.g., if the planes in a memory die are capable of being independently and concurrently operated) or multiple die may include subsets of the resources 210 (e.g., a first die may include first resource 210-1 and second resource 210-2 and a second die may include third resource 210-3 and fourth resource 210-4. In some examples, one or more of the resources 210 is a plane in a die and one or more of the resources 210 is a die.

Although four resources 210 are depicted in FIG. 2A, other quantities are possible. For example, there may be a decreased quantity of resources 210 (e.g., two resources) or an increased quantity of resources 210 (e.g., five resources, six resources, or eight resources). In some examples, the quantity of resources 210 is equivalent to a power of two.

Controller 205 may be configured to manage resources 210. In some examples, controller 205 partitions resources 210 into virtual blocks. A virtual block may include memory cells in each of the resources 210. During a synchronous access operation (e.g., a programming or read operation), controller 205 may access a virtual block, simultaneously accessing memory cells across resources 210.

As described herein, controller 205 may manage virtual blocks within resources 210 that are accessed in accordance with a single-level access mode (which may be referred to as "single-level virtual blocks") and virtual blocks within resources 210 that are accessed in accordance with a multi-level access mode (which may be referred to as "multi-level virtual blocks"). Controller 205 may only be capable of accessing one of a single-level virtual block or a multi-level virtual block at a time. That is, if controller 205 is currently accessing a single-level virtual block, controller 205 may be unable to concurrently access a multi-level virtual block, or vice versa. Thus, while accessing a multi-level virtual block, controller 205 may delay accessing a single-level virtual block, and vice versa. That said, the effect of delaying single-level virtual blocks may be more pronounced (e.g., from a host system's perspective) due to the longer duration associated with accessing multi-level virtual blocks.

Controller 205 may be configured to perform folding operations, which include writing data from single-level virtual blocks to multi-level virtual blocks. Folding operations may increase an amount of available single-level resources for decreased latency (e.g., relative to multi-level resources) access operations—e.g., by transferring the data stored in a quantity of single-level virtual blocks (e.g., four single-level virtual blocks) to a decreased quantity of multi-level virtual blocks (e.g., one multi-level virtual block). As described herein, since controller 205 may be unable to access the resources 210 for other access operations while a folding operation is ongoing, controller 205 may delay folding operations until an idle period. However, in some examples, controller 205 may be unable to delay folding operations until an idle period—e.g., if an available capacity of resources 210 falls below a threshold such that continued single-level programming operations for resources 210 will shortly cause all of resources 210 to be utilized. If a folding operation is performed during an active period, a controller 205 may delay executing a programming command received from a host system until the folding operation is completed even if single-level resources are available—e.g., because the folding operations may monopolize components for accessing the resources. Thus, the host system may be exposed to the delay caused by the folding operation.

Figure 2B:
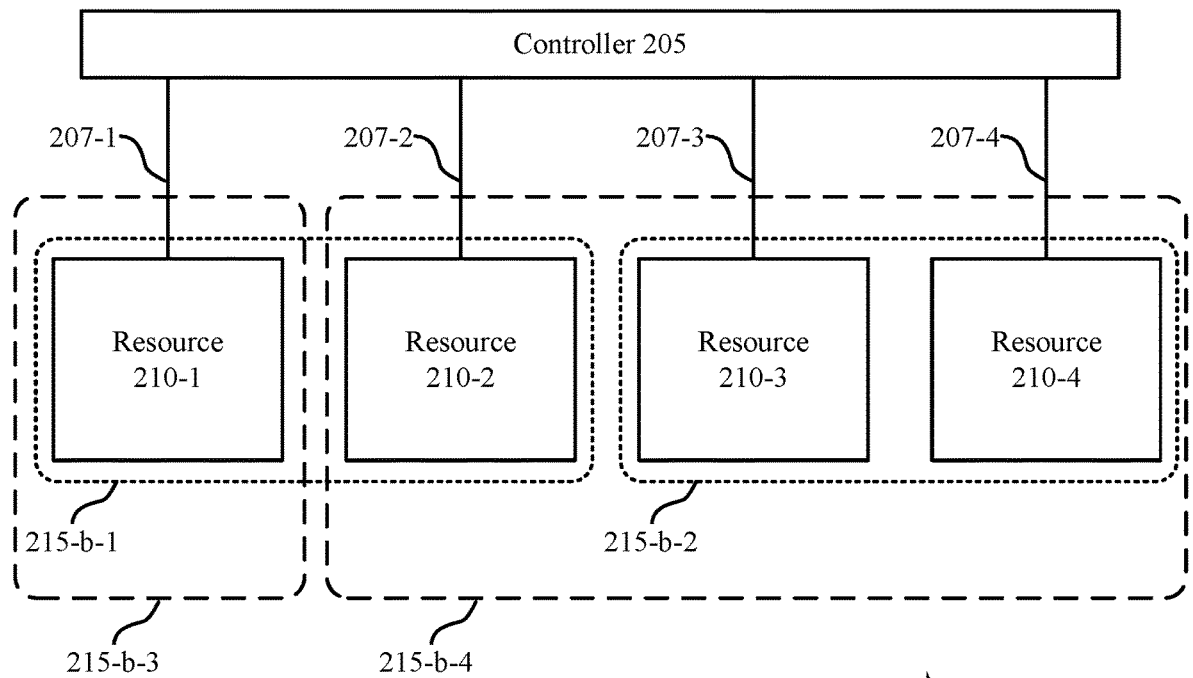

In FIG. 2B, controller 205 may implement techniques for preventing a host system from being exposed to a delay caused by folding operations while allowing folding operations to be executed. Controller 205 may be configured to partition resources 210 into resource groups 215-*b*. In some examples, controller 205 designates first resource group 215-*b*-1 as including first resource 210-1 and second resource 210-2 and second resource group 215-*b*-2 as including third resource 210-3 and fourth resource 210-4. In some examples, controller 205 designates the resource groups 215 after determining a utilization of resources 210 has exceeded a threshold—e.g., controller 205 enters an operating mode (which may be referred to as a "high utilization mode") that enables concurrent single-level and multi-level access operations when the utilization of resources 210 exceeds the threshold.

Based on designating the resource groups, controller 205 may configure one of the resource groups 215-*b* (e.g., first resource group 215-*b*-1) for single-level operations and the other of the resource groups 215-*b* (e.g., second resource group 215-*b*-2) for multi-level operations. Accordingly, controller 205 may form and manage single-level virtual blocks that extend across a resource group (e.g., first resource group 215-*b*-1) and multi-level virtual blocks that extend across the other resource group (second resource group 215-*b*-2), rather than extending across all of resources 210. Based on forming single-level virtual blocks and multi-level virtual blocks that extend across respective resource groups 215-*b*, controller 205 may be capable of concurrently accessing single-level virtual blocks and multi-level virtual blocks—e.g., because accessing single-level virtual blocks in first resource group 215-*b*-1 no longer causes resources in second resource group 215-*b*-2 to be accessed. Similarly, accessing multi-level virtual blocks in second resource group 215-*b*-2 will no cause resources in first resource group 215-*b*-1 to be accessed. Based on entering the high utilization mode, controller 205 may perform folding operations in second resource group 215-*b*-2 while concurrently performing programming operations in first resource group 215-*b*-1 (e.g., to quickly execute write operations received from a host system).

In some examples, after a duration elapses, controller 205 may reconfigure first resource group 215-*b*-1 to support multi-level operations and reconfigure second resource group 215-*b*-2 to support single-level operations. By alternating the configuration of the resource groups 215-*b* between supporting single-level and multi-level operations, the utilization of resources in the resource groups 215-*b* may be balanced. That is, while operating in the high utilization mode, a rate of programming single-level virtual blocks may exceed a rate of programming multi-level virtual blocks (e.g., due to the extended duration for performing multi-level access operations) and an available capacity of the resource group configured for single-level operation may more quickly decrease. Thus, alternating the configurations may prevent the available capacity of any one resource group from being exhausted—e.g., for a long enough duration to enable the folding operations (and garbage collection operations) to restore an available capacity that allows the controller to return to a normal-utilization operating mode.

Although the resource groups 215 are depicted in FIG. 2B as each including two of the resources 210, other groupings are possible. For example, a first resource group (e.g., third resource group 215-b-3) may include first resource 210-1, and a second resource group (e.g., fourth resource group 215-b-4) may include second resource 210-2, third resource 210-3, and fourth resource 210-4. In some examples, the groupings are based on different thresholds being exceeded. For example, controller 205 may designate the first resource group as including first resource 210-1, second resource 210-2, and third resource 210-3 and a second resource group as including fourth resource 210-4 when the utilization of resources 210 exceeds a first threshold; the first resource group as including first resource 210-1 and second resource 210-2 and the second resource group as including third resource 210-3 and fourth resource 210-4 when the utilization of resources 210 exceeds a second threshold; and the first resource group as including first resource 210-1 and the second resource group as including second resource 210-2, third resource 210-3, and fourth resource 210-4 when the utilization of resources 210 exceeds a third threshold.

Figure 3:
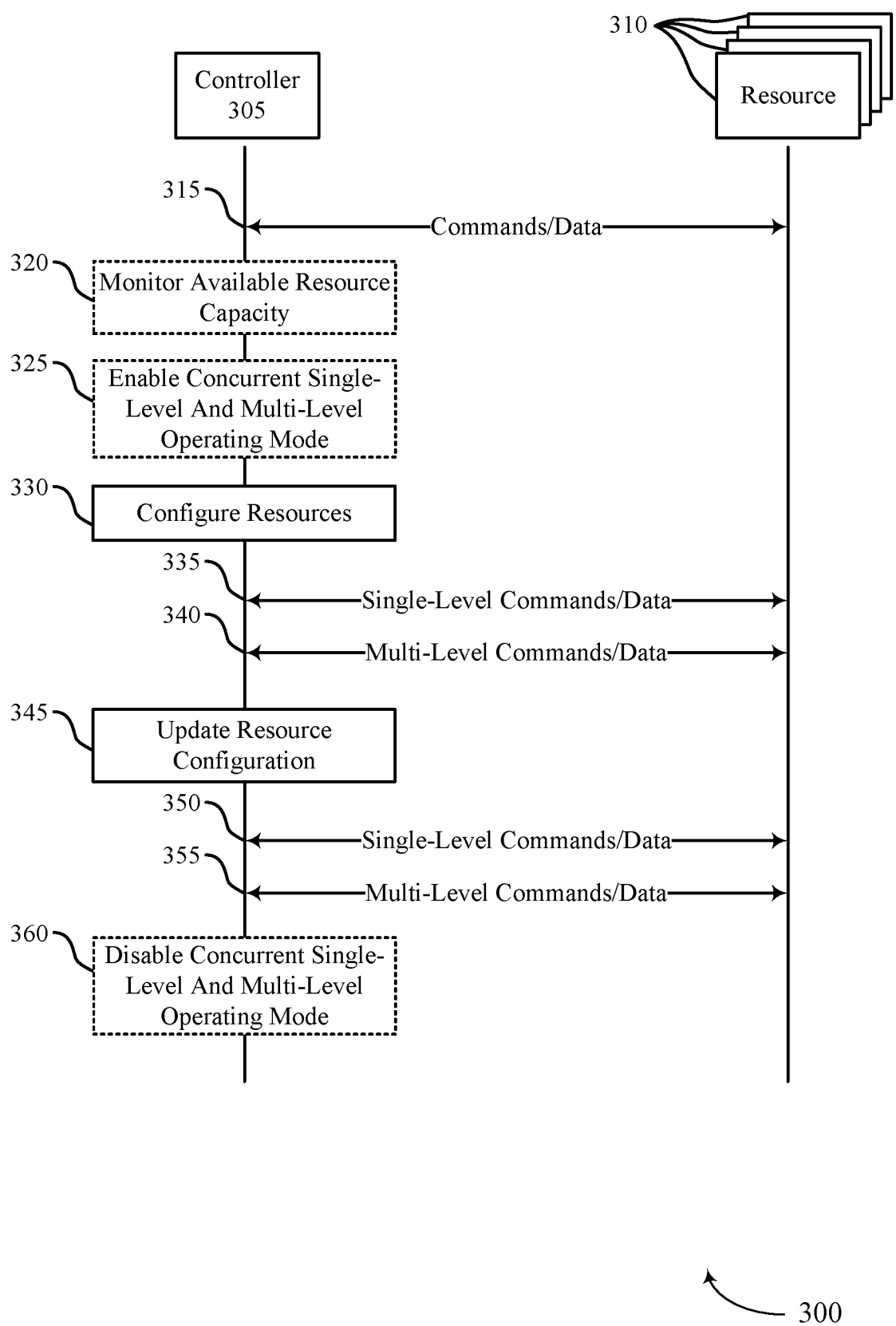
FIG. 3 illustrates an example set of operations for managing single-level and multi-level programming operations in accordance with examples as disclosed herein.

FIG. 3 illustrates an example of a set of operations for managing single-level and multi-level programming operations in accordance with examples as disclosed herein.

Process flow 300 may be performed by controller 305 and resources 310. Controller 305 may be an example of a host system controller, memory system controller, or local controller, as described with reference to FIG. 1, or a controller as described with reference to FIG. 2. Resources 310 may be examples of resources described with reference to FIG. 2. In some examples, process flow 300 illustrates an example set of operations performed to support managing single-level and multi-level programming operations. For example, process flow 300 may include operations for grouping resources to support concurrent single-level and multi-level access operations—e.g., based on entering a high-utilization mode when a utilization of resources 310 exceeds a threshold.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller (e.g., controller 305), may cause the controller to perform the operations of the process flow 300.

One or more of the operations described in process flow 300 may be performed earlier or later, omitted, replaced, supplemented, or combined with another operation. Also, additional operations described herein may replace, supplement or be combined with one or more of the operations described in process flow 300.

At 315, commands and data may be transmitted between controller 305 and resources 310. For example, controller 305 may transmit programming or read commands to resources 310. Controller 305 transmitting programming commands for programming multi-level virtual blocks at resources 310, programming command for programming single-level virtual blocks, or both. Resources 310 may output data in response to a single-level or multi-level read command received from controller 305.

In some examples, controller 305 uses single-level programming commands to write, to a single-level virtual block at resources 310, data received from a host system (e.g., as soon as possible). Due to the reduced duration for single-level programming operations, controller 305 may program the single-level virtual block in a reduced duration and, thus, can execute commands received from a host system with minimal latency. Accordingly, the multi-level cells in resources 310 that are programmed using single-level operations may be used as a cache.

Because writing to the multi-level cells using single-level operations fails to fully utilize the capacity of the multi-level cells (and thus the resources 310), controller 305 may execute folding operations for resources 310. The folding operations (e.g., in combination with garbage collection operations) may be used to increase an available capacity of resources 310—e.g., relative to before the folding operation, three additional multi-level cells may become available each time a set of multi-level cells storing single-level data is folded into a multi-level cell).

Folding operations may be performed while a memory system including controller 305 is in an idle state (e.g., commands are not being received from the host device) or when an available capacity of resources 310 exceeds a threshold (which may occur while the memory system in an active state). As described herein, while operating in a normal-utilization mode, multi-level operations performed for resources 310 may interfere with (e.g., delay) a performance of single-level operations for resources 310. Accordingly, controller 305 may be configured to enable concurrent caching operation (programming of multi-level cells using single-level techniques) and folding operations (transferring data from multi-level cells storing single-level data to multi-level cells using multi-level techniques)—e.g., when folding operations are trigged and the memory system is in an active state.

At 320, an available capacity of resources 310 may be monitored—e.g., by controller 305. In some examples, controller 305 monitors the available capacity by monitoring a quantity of multi-level memory cells that have not yet been written (e.g., that are free). Controller 305 may monitor the available capacity against multiple utilization thresholds and may continue to monitor the available capacity throughout the following operations.

At 325, a high-utilization mode that supports concurrent single-level and multi-level access operations may be enabled—e.g., by controller 305. Controller 305 may enable the high-utilization mode based on detecting that an available capacity of resources 310 has satisfied a threshold (e.g. met or exceeded the utilization threshold).

At 330, resources 310 may be configured to support concurrent single-level and multi-level access operations based on the high-utilization mode being enabled. For example, controller 305 may group resources 310 into resource groups. Based on establishing the resource groups, controller 305 may configure the resource groups for either single-level or multi-level operations. For example, controller 305 may configure a first resource group for single-level operations and a second resource group for multi-level operations, or vice versa.

In some examples, controller 305 includes all but one of the resources 310 in a first resource group and the remaining resource 310 in a second resource group—e.g., based on a first utilization threshold being satisfied. Thus, a virtual single-level resource block of a first size may extend across the first resource-group and a multi-level resource block of a first size may extend across the second resource group. In some examples, controller includes all but two of resources 310 in a first resource group and the remaining two resources in a second resource group—e.g., based on a second utilization threshold being satisfied. Thus, a virtual single-level resource block of a second, smaller size may extend across the first resource-group and a multi-level resource block of a second, larger size may extend across the second resource group. And so on. Each time additional resources are included in the second resource group, controller may be configuring additional resources for folding operations—e.g., to increase a rate at which available capacity of resources 310 is restored.

In some examples, controller 305 may configure one of the resource groups to support solely single-level operations while configuring the other of the resource groups to support non-overlapping single-level operations and multi-level operations. In such cases, virtual single-level resource blocks and multi-level resource blocks may extend across the resources of the other resource group.

At 335, single-level commands may be used to access (e.g., read or program) single-level data at a resource group configured to support single-level access operations. For example, controller 305 may transmit a single-level programming command to a first resource group of resources 310 configured to support single-level access operation (e.g., to support a caching function).

At 340, multi-level commands may be used to access (e.g., read or program) multi-level data at a resource group configured to support single-level access operation. For example, controller 305 may transmit a single-level folding command to a second resource group of resources 310 configured to support multi-level access operation (e.g., to free up space for the caching function).

At 345, the configuration of resources 310 may be updated. For example, controller 305 may include an additional resource in a second resource group if a second utilization threshold is satisfied, where the second utilization threshold may be higher than the first utilization threshold. Thus, a virtual multi-level resource block may extend across the second resource group. In such cases, a quantity of resources 310 available for folding operations may be increased. In other examples, the controller may include an additional resource in a first resource group if a second, lower utilization threshold is satisfied. In such cases, a quantity of resources 310 available for caching operations may be increased. In some examples, controller 305 may alternate the single-level and multi-level designations such that a resource group configured to support single-level operations is reconfigured to support multi-level operations and the other resource group configured to support multi-level operations is reconfigured to support single-level operations.

At 350, single-level commands may be used to access single-level data at the reconfigured resource group supporting single-level access operation.

At 355, multi-level commands may be used to access multi-level data at the reconfigured resource group supporting single-level access operation.

At 360, the high-utilization mode may be disabled—e.g., based on a utilization of resources 310 satisfying a threshold. In some examples, controller 305 enters a normal-utilization mode after detecting that a utilization of resources 310 has reached or fallen below a threshold. The threshold may be the same as the threshold that triggered enabling the high-utilization mode. Alternatively, the threshold may be different (e.g., lower) than the threshold that triggered enabling the high-utilization mode. In some examples, operating in a normal-utilization mode qualifies as a special case of the high-utilization where all of resources 310 are included in a single resource group.

Figure 4:
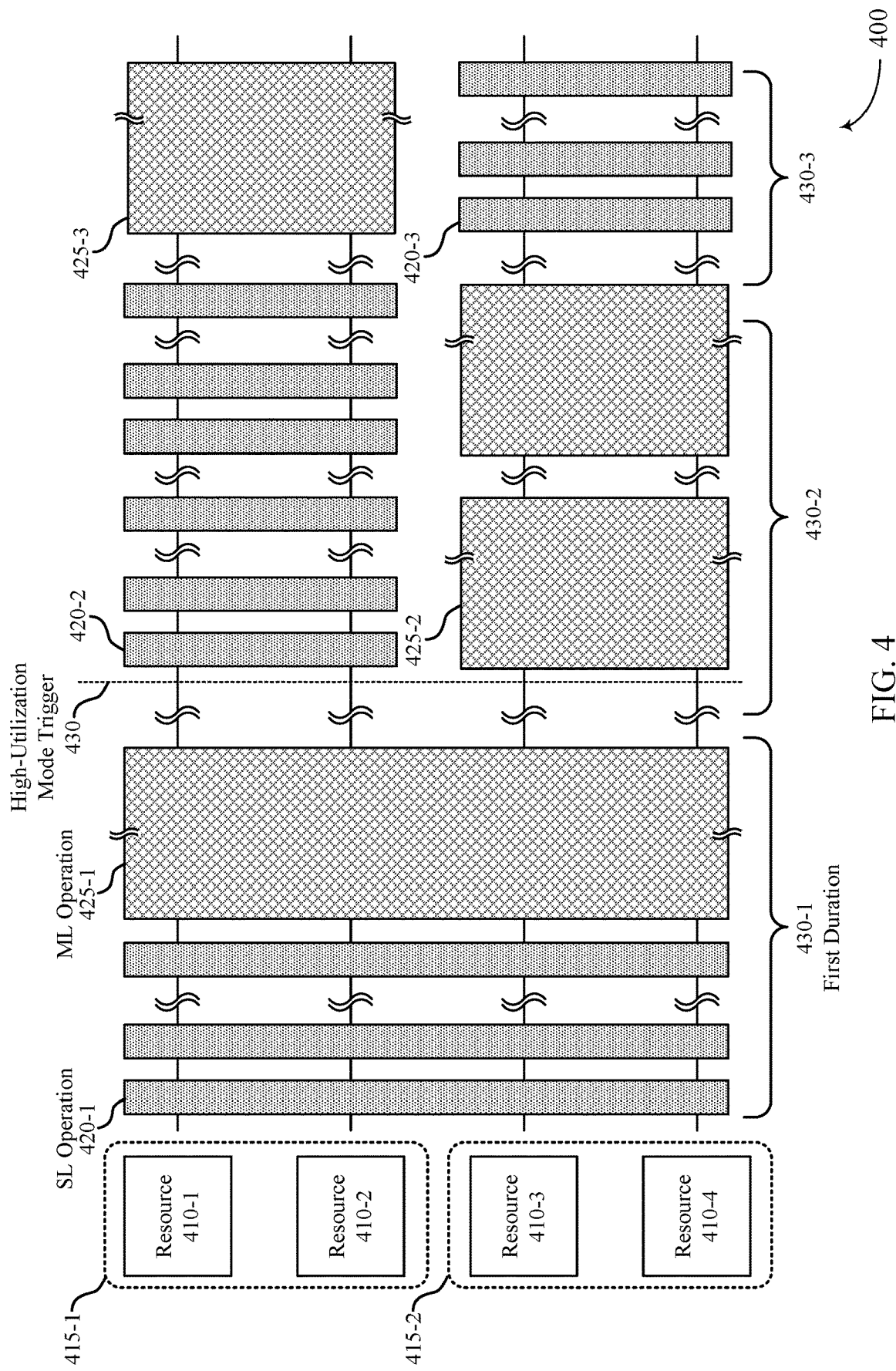
FIG. 4 illustrates an example of an operation diagram for managing single-level and multi-level programming operations in accordance with examples as disclosed herein.

FIG. 4 illustrates an example of an operational diagram for managing single-level and multi-level programming operations in accordance with examples as disclosed herein.

Operational diagram 400 depicts the performance of single-level and multi-level access operations for resources 410 over time. Resources 410 and resource groups 415 may be examples of resources and resource groups as described herein with reference to FIGS. 2 and 3.

During first duration 430-1, a controller (e.g., as described with reference to FIGS. 1 through 3) may be operating in a normal-utilization mode. Thus, the controller may access single-level virtual blocks that extend across all of the resources 410 during first duration by performing single-level operations, such as first single-level operation 420-1. During non-overlapping time intervals within first duration 430-1, the controller may also access multi-level virtual blocks that extend across all of the resources 410 using multi-level operations, such as first multi-level operation 425-1.

Subsequently, the controller may enter a high-utilization mode—e.g., based on high-utilization mode trigger 430 being activated. High-utilization mode trigger 430 may be activated when a utilization of the resources 410 exceeds a threshold. Based on high-utilization mode trigger 430 occurring, the controller may group resources 410 into resource groups 415. For example, the controller may group first resource 410-1 and second resource 410-2 into first resource group 415-1. Also, the controller may group third resource 410-3 and fourth resource 410-4 into second resource group 415-2.

Based on grouping the resources 410, the controller may configure the resource groups 415 for either single-level operations or multi-level operations. In some examples, the controller configures first resource group 415-1 for single-level operations and second resource group 415-2 for multi-level operations. Accordingly, the controller may manage single-level virtual blocks that extend across first resource group 415-1 and multi-level virtual blocks that extend across second resource group 415-2.

Based on configuring the resource groups 415, the controller may access, during second duration 430-2, single-level virtual blocks in first resource group 415-1 using single-level operations, such as second single-level operation 420-2. Concurrently (e.g., during an overlapping time interval of second duration 430-2), the controller may access multi-level virtual blocks in second resource group 415-2. In some examples, the controller may perform multiple single-level access operations of first resource group 415-1 while second multi-level operation 425-2 is being performed—e.g., due to the extended duration of multi-level access operations relative to single-level access operations. By enabling multiple single-level access operations to be performed concurrently with a multi-level access operation, the controller may continue to operate a portion of resources 410 as a cache—e.g., so that a host system is exposed only to the latency of the single-level access operations.

Because multi-level memory cells in first resource group 415-1 (and single-level virtual blocks) may be programmed using single-level operations at a higher rate than multi-level memory cells (and multi-level virtual blocks) in second resource group 415-2 are programmed using multi-level operations, a quantity of available multi-level cells in first resource group 415-1 may decrease more quickly than a quantity of available multi-level cells in second resource group 415-2. Accordingly, the controller may alternate the configurations of the resource groups 415 while operating in the high-utilization mode e.g., so that the resource group configured for single-level operations does not become over-utilized. In some examples, the controller alternates the configurations periodically. Additionally, or alternatively, the controller may alternate the configurations when a utilization of the resource group being used as a cache exceeds a threshold.

At a beginning of third duration 430-3, the controller may reconfigure first resource group 415-1 to support multi-level access operations and second resource group 415-2 to support single-level access operations. Accordingly, the controller may access first resource group 415-1 using multi-level operations, such as third multi-level operation 425-3, and may access second resource group 415-2 using single-level operations, such as third single-level operation 420-3.

Figure 5:
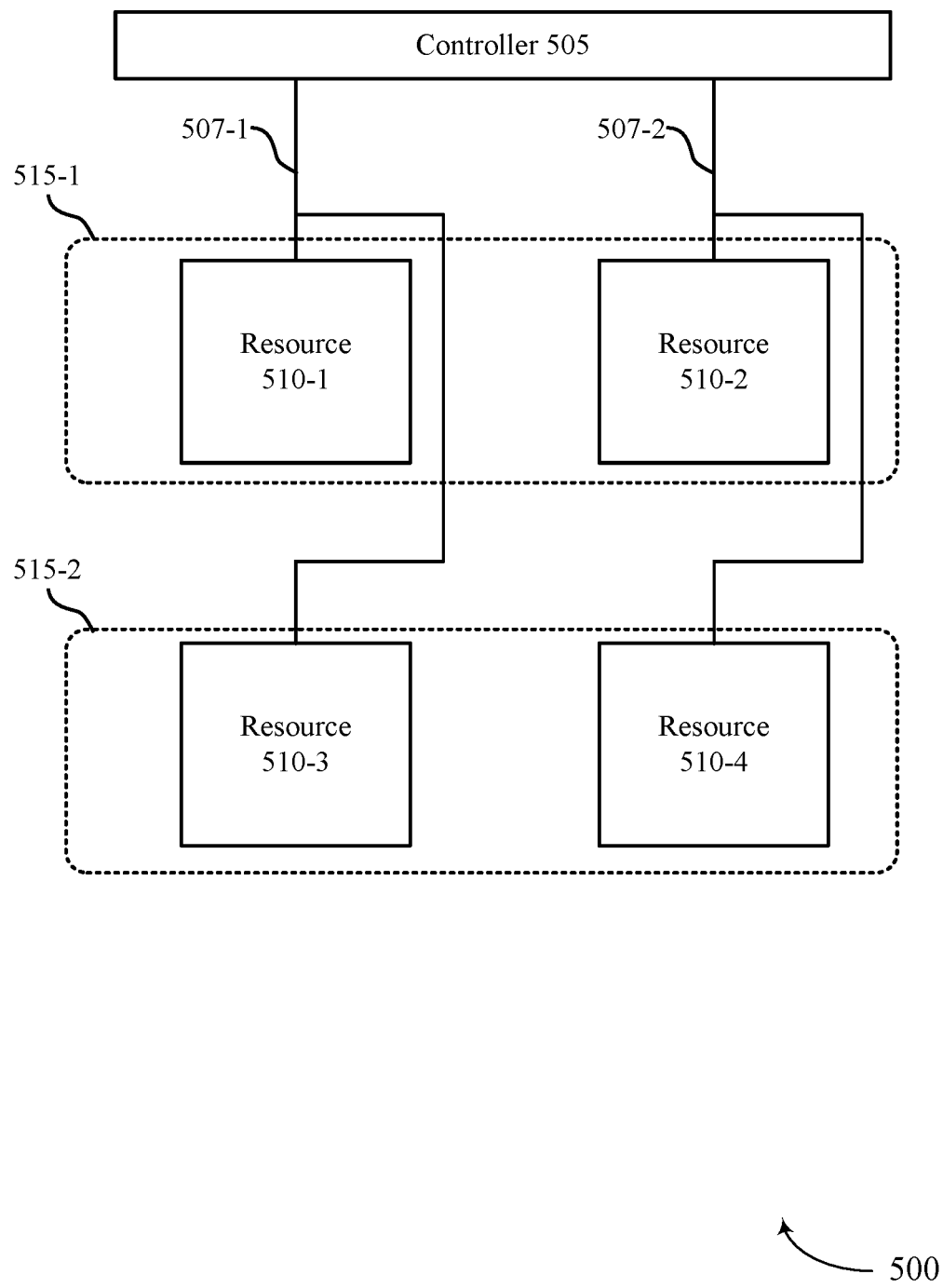
FIG. 5 illustrates an example of a subsystem that supports managing single-level and multi-level programming operations in accordance with examples as disclosed herein.

FIG. 5 illustrates an example of a subsystem that supports managing single-level and multi-level programming operations in accordance with examples as disclosed herein.

Subsystem 500 depicts aspects of a memory system including controller 505, connections 507, and resources 510. Controller 505 may be an example of a host system controller, a memory system controller, or a local controller, as described with reference to FIG. 1 or a controller described with reference to FIG. 2. Controller 505 may be connected to resources 510 via connections 507. In contrast to FIG. 2, controller 505 may be connected to first resource 510-1 and third resource 510-3 via a shared connection, first connection 507-1. Also, controller 505 may be connected to second resource 510-2 and fourth resource 510-4 via a different shared connection, second connection 507-2. Accordingly, controller 505 may multiplex (e.g., in time or frequency) communications for resources that are connected to a shared connection. For example, controller 505 may send, via first connection 507-1, a command to first resource 510-1 during a first duration and send a command to third resource 510-3 during an adjacent, following duration. And may receive data from first resource 510-1 in a third duration and receive data from third resource 510-3 during an adjacent, following duration. In some examples, resources may be configured to share a connection to reduce a footprint of a memory system.

Resources 510 may be examples of resource 210 as described with reference to FIG. 2. Although four resources 510 are depicted in FIG. 5A, other quantities are possible. For example, there may be a decreased quantity of resources 510 (e.g., two resources) or an increased quantity of resources 510 (e.g., five resources, six resources, or eight resources). In some examples, the quantity of resources 510 is equivalent to a power of two.

Controller 505 may be configured to manage resources 510. In some examples, controller 505 partitions resources 510 into virtual blocks. A virtual block may include memory cells in a set of resources that may be simultaneously accessed (e.g., first resource 510-1 and second resource 510-2). Thus, a single-level or a multi-level virtual block may extend across a set of resources that do not share a connection—e.g., because simultaneously accessing resources in resources that share a connection may not be supported. During a synchronous access operation (e.g., a programming or read operation), controller 505 may access a virtual block, simultaneously accessing memory cells across the set of resources.

Figure 6:
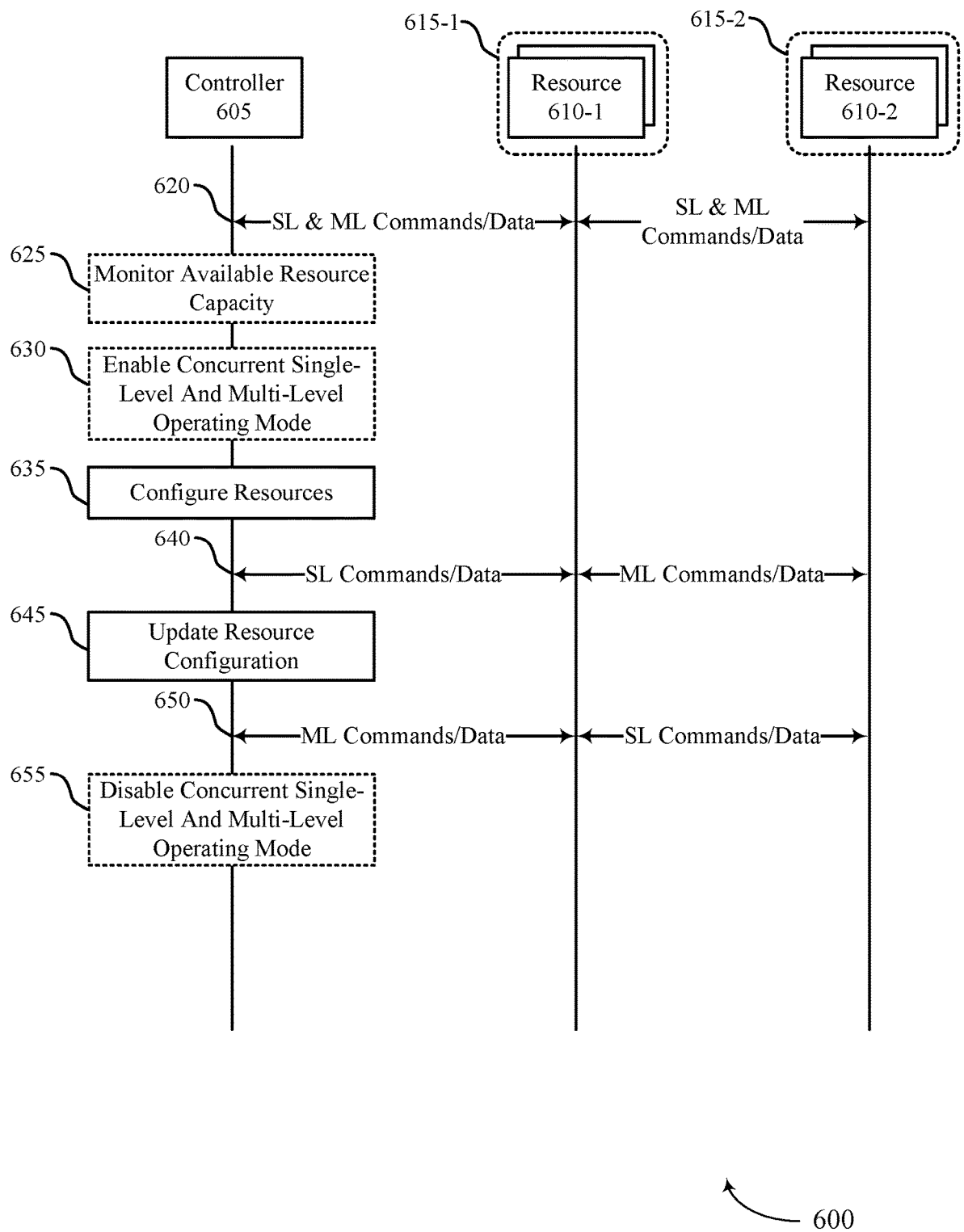
FIG. 6 illustrates an example of a set of operations for managing single-level and multi-level programming operations in accordance with examples as disclosed herein.

FIG. 6 illustrates an example of a set of operations for managing single-level and multi-level programming operations in accordance with examples as disclosed herein.

Process flow 600 may be performed by controller 605 and resources 610. Controller 605 may be an example of a host system controller, memory system controller, or local controller, as described with reference to FIG. 1 or a controller as described with reference to FIGS. 2 through 5. Resources 610 may be examples of resources described with reference to FIG. 5. A subset of resources 610 may share a connection (e.g., an ONFI channel) to controller 605—e.g., first resource 610-1 and second resource 610-2 may share a connection.

In some examples, process flow 600 illustrates an example set of operations performed to support managing single-level and multi-level programming operations. For example, process flow 600 may include operations for concurrently performing single-level and multi-level access operations—e.g., based on entering a high-utilization mode when a utilization of resources 610 exceeds a threshold. Aspects of the process flow 600 may be implemented by a controller, among other components. Additionally, or alternatively, aspects of the process flow 600 may be implemented as instructions stored in memory (e.g., firmware stored in a memory coupled with a controller). For example, the instructions, when executed by a controller (e.g., controller 605), may cause the controller to perform the operations of the process flow 600.

One or more of the operations described in process flow 600 may be performed earlier or later, omitted, replaced, supplemented, or combined with another operation. Also, additional operations described herein may replace, supplement or be combined with one or more of the operations described in process flow 600.

At 620, commands and data may be transmitted between controller 605 and resources 610. For example, controller 605 may transmit programming or read commands to resources 610. Controller 605 transmitting programming commands for programming multi-level virtual blocks at resources 610, programming command for programming single-level virtual blocks, or both. Resources 610 may output data in response to a single-level or multi-level read command received from controller 605. Controller 605 may perform single-level and multi-level operations (e.g., single-level programming operations, folding operations, etc.) to access resources 610 as similarly described with reference to the operations described at 315 of FIG. 3—though commands and data for resources sharing a connection (e.g., an ONFI channel) may be multiplexed.

At 625, an available capacity of resources 610 may be monitored (e.g., by controller 605) as similarly described with reference to the operations described at 320 of FIG. 3. At 630, a high-utilization mode that supports concurrent single-level and multi-level access operations may be enabled (e.g., by controller 605) based on detecting that the available capacity of resources 610 has satisfied a threshold as similarly described with reference to the operations described at 325 of FIG. 3.

At 635, resources 610 may be configured to support concurrent single-level and multi-level access operations based on the high-utilization mode being enabled. For example, controller 605 groups the resources 610 into resource groups 615. In some examples, controller 605 groups resources that do not share a connection into first resource group 615-1 and resources that do share a connection (e.g., first resource 610-1 and second resource 610-2) into second resource group 615-2. Based on establishing the resource groups, controller 605 may configure the resource groups 615 for either single-level or multi-level operations. For example, controller 605 may configure first resource group 615-1 for single-level operations and second resource group 615-2 for multi-level operations, or vice versa. Thus, single-level virtual blocks may extend across one resource group (e.g., first resource group 615-1) and multi-level virtual blocks may extend across the other resource group (e.g., second resource group 615-2).

In some examples, controller 605 may configure first resource group 615-1 solely for single-level operations and second resource group 615-2 for either single-level or multi-level operations, or vice versa. In such cases, virtual single-level resource blocks and multi-level resource blocks may extend across the resources of the other resource group.

At 640, single-level commands may be used to access (e.g., read or program) single-level data at first resource group 615-1 and multi-level commands may be used to access (e.g., read or program) multi-level data at second resource group 615-2—e.g., based on first resource group 615-1 being configured for single-level operations and second resource group 615-2 being configured for multi-level operations. The single-level commands and data exchanged with first resource group 615-1 may be multiplexed with the multi-level commands and data exchanged with second resource group 615-2.

At 645, the configuration of resource 610 may be updated. For example, controller 605 may reconfigure a resource group configured to support single-level operations (e.g., first resource group 615-1) to support multi-level operations and a resource group configured to support multi-level operations (e.g., second resource group 615-2) to support single-level operations. By alternating the single-level and multi-level configurations, controller 605 may prevent a utilization of one of the resource groups 615 (e.g., the resource group configured for single-level, caching operations) from reaching a utilization threshold more quickly than the other of the resource groups 615.

At 650, single-level commands may be used to access (e.g., read or program) single-level data at second resource group 615-2 and multi-level commands may be used to access (e.g., read or program) multi-level data at first resource group 615-1— based on the reconfiguring.

At 655, the high-utilization mode may be disabled as similarly described with reference to the operations described at 360 of FIG. 3.

Figure 7:
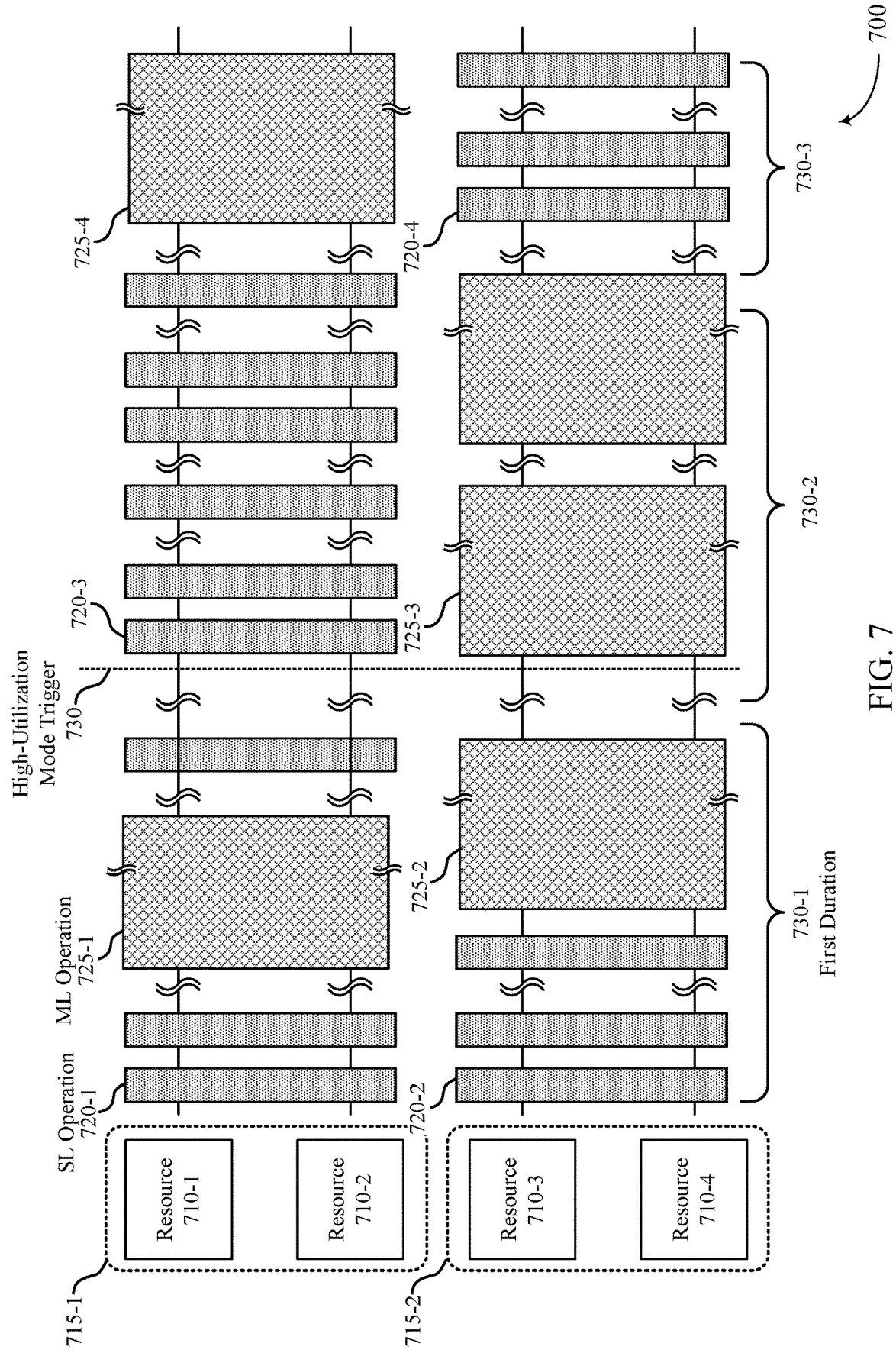
FIG. 7 illustrates an example of an operation diagram for managing single-level and multi-level programming operations in accordance with examples as disclosed herein.

FIG. 7 illustrates an example of an operational diagram for managing single-level and multi-level programming operations in accordance with examples as disclosed herein.

Operational diagram 700 depicts the performance of single-level and multi-level access operations for resources 710 over time. Resources 710 and resource groups 715 may be examples of resources and resource groups as described herein with reference to FIGS. 5 and 6.

During first duration 730-1, a controller (e.g., as described with reference to FIGS. 1 through 3, 5, and 6) may be operating in a normal-utilization mode. As compared to the normal-utilization operation depicted in operational diagram 400 of FIG. 4, in FIG. 7, a controller may access single-level and multi-level virtual blocks that extend across subsets of resource 710 (rather than across all of resources 710) while operating in the normal-utilization mode.

Subsequently, the controller may enter a high-utilization mode—e.g., based on high-utilization mode trigger 730 being activated. High-utilization mode trigger 730 may be activated when a utilization of the resources 710 exceeds a threshold. Based on high-utilization mode trigger 730 occurring, the controller may group resources 710 into resource groups 715. For example, the controller may group first resource 710-1 and second resource 710-2 into first resource group 715-1—e.g., based on these resources not sharing a connection to the controller. Also, the controller may group third resource 710-3 and fourth resource 710-4 into second resource group 715-2—e.g., based on these resources not sharing a connection to the controller.

Based on grouping the resources 710, the controller may configure the resource groups 715 for either single-level operations or multi-level operations. In some examples, the controller configured first resource group 715-1 for single-level operations and second resource group 715-2 for multi-level operations. Accordingly, the controller may manage single-level virtual blocks that extend across first resource group 715-1 and multi-level virtual blocks that extend across second resource group 715-2.

Based on configuring the resource groups 715, the controller may access, during second duration 730-2, single-level virtual blocks in first resource group 715-1 using single-level operations, such as third single-level operation 720-3. Concurrently (e.g., during an overlapping time interval of second duration 730-2), the controller may access multi-level virtual blocks in second resource group 715-2. In some examples, the controller may perform multiple single-level access operations of first resource group 715-1 while third multi-level operation 725-3 is being performed—e.g., due to the extended duration of multi-level access operations relative to single-level access operations. By enabling multiple single-level access operations to be performed concurrently with a multi-level access operation, the controller may continuously operate a portion of resources 710 as a cache—e.g., so that a host system is exposed only to the latency of the single-level access operations.

Because multi-level memory cells in first resource group 715-1 (and single-level virtual blocks) may be programmed using single-level operations at a higher rate than multi-level memory cells (and multi-level virtual blocks) in second resource group 715-2 are programmed using multi-level operations, a quantity of available multi-level cells in first resource group 715-1 may decrease more quickly than a quantity of available multi-level cells in second resource group 715-2. Accordingly, the controller may alternate the configurations of the resource groups 715 while operating in the high-utilization mode e.g., so that the resource group configured for single-level operations does not become over-utilized. In some examples, the controller alternates the configurations periodically. Additionally, or alternatively, the controller may alternate the configurations when a utilization of the resource group being used as a cache exceeds a threshold.

At a beginning of third duration 730-3, the controller may reconfigure first resource group 715-1 to support multi-level access operations and second resource group 715-2 to support single-level access operations. Accordingly, the controller may access first resource group 715-1 using multi-level operations, such as fourth multi-level operation 725-4, and may access second resource group 715-2 using single-level operations, such as fourth single-level operation 420-4.

Figure 8:
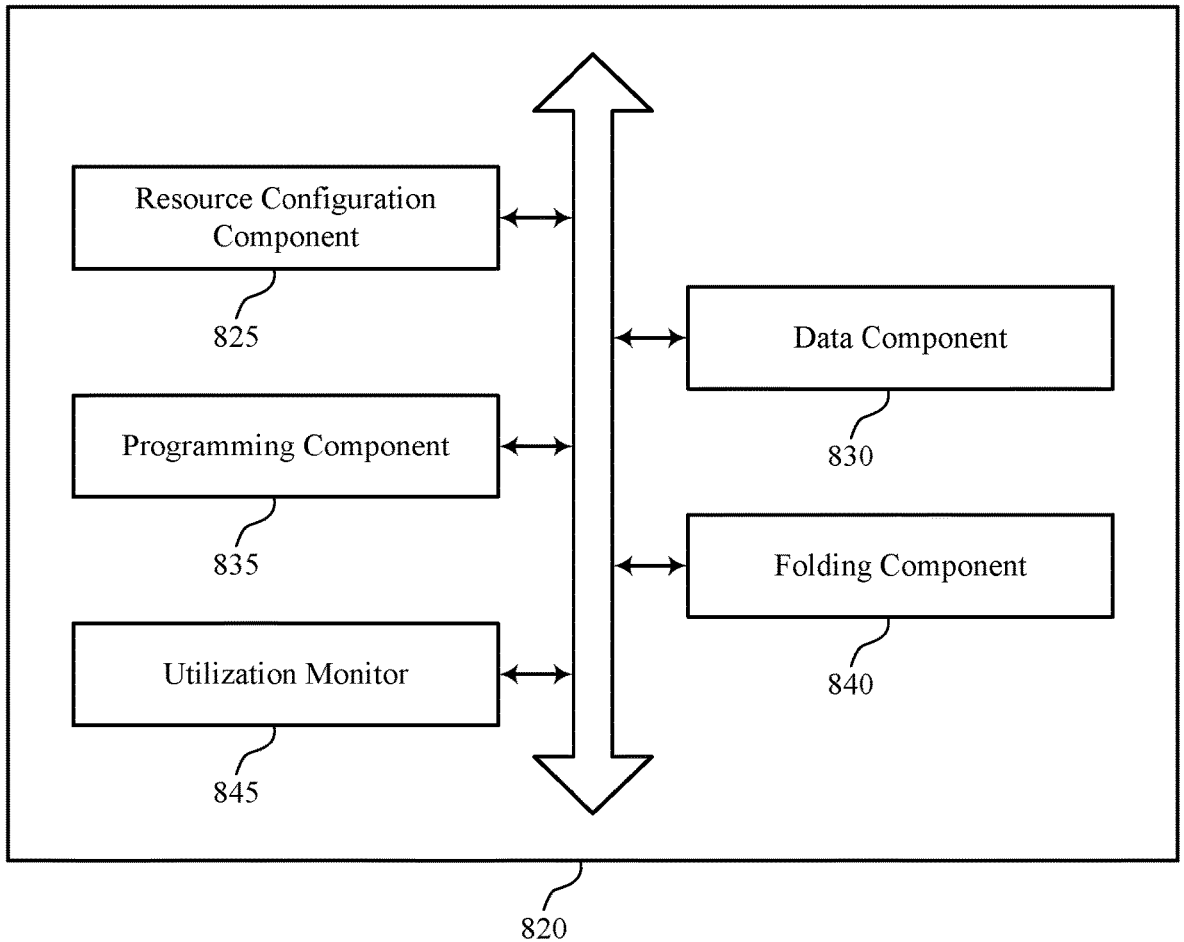
FIG. 8 shows a block diagram of a memory controller that supports managing single-level and multi-level programming operations in accordance with examples as disclosed herein.

FIG. 8 shows a block diagram 800 of a memory controller 820 that supports managing single-level and multi-level programming operations in accordance with examples as disclosed herein. The memory controller 820 may be an example of aspects of a memory controller as described with reference to FIGS. 1 through 7. The memory controller 820, or various components thereof, may be an example of means for performing various aspects of managing single-level and multi-level programming operations as described herein. For example, the memory controller 820 may include a resource configuration component 825, a data component 830, a programming component 835, a folding component 840, a utilization monitor 845, or any combination thereof. Each of these components may communicate, directly or indirectly, with one another (e.g., via one or more buses).

The resource configuration component 825 may be configured as or otherwise support a means for configuring, for a first duration, a first set of planes of a plurality of planes for single-level programming and a second set of planes of the plurality of planes for multi-level programming, where the first set of planes and the second set of planes each include one or more respective planes. The data component 830 may be configured as or otherwise support a means for receiving, from a host device during the first duration, a first set of data. The programming component 835 may be configured as or otherwise support a means for writing, during the first duration and in accordance with a single-level programming operation, the first set of data to a first virtual block that spans the first set of planes. The folding component 840 may be configured as or otherwise support a means for transferring, during the first duration and in accordance with a multi-level programming operation, a second set of data from the first set of planes or the second set of planes to a second virtual block that spans the second set of planes.

In some examples, a plurality of channels is coupled with the plurality of planes and the controller and each channel of the plurality of channels is coupled with a respective plane of the plurality of planes.

In some examples, the data component 830 may be configured as or otherwise support a means for receiving, from the host device during an earlier duration that precedes the first duration, a third set of data. In some examples, the programming component 835 may be configured as or otherwise support a means for writing, during the earlier duration and in accordance with a second single-level programming operation, the third set of data to a third virtual block that spans the plurality of planes.

In some examples, the folding component 840 may be configured as or otherwise support a means for writing, during the earlier duration and in accordance with a second multi-level programming operation, a fourth set of data to a fourth virtual block that spans the plurality of planes.

In some examples, the utilization monitor 845 may be configured as or otherwise support a means for determining whether a utilization of the plurality of planes satisfies a threshold, where configuring the first set of planes for single-level programming and the second set of planes for multi-level programming is based at least in part on the utilization monitor 845 determining that the utilization satisfies the threshold.

In some examples, to support configuring the first set of planes and the second set of planes, the resource configuration component 825 may be configured as or otherwise support a means for allocating, for the first duration based at least in part on the utilization satisfying the threshold, a first plane of the plurality of planes and a second plane of the plurality of planes for single-level programming and a third plane of the plurality of planes and a fourth plane of the plurality of planes for multi-level programming, where the first set of planes includes the first plane and the second plane, and the second set of planes includes the third plane and the fourth plane.

In some examples, the first virtual block spans the first plane and the second plane of the first set of planes, and the second virtual block spans the third plane and the fourth plane of the second set of planes.

In some examples, the utilization monitor 845 may be configured as or otherwise support a means for determining whether the utilization of the plurality of planes satisfies a second threshold that is greater than the threshold. In some examples, the resource configuration component 825 may be configured as or otherwise support a means for configuring, for a second duration that follows the first duration, a third set of planes of the plurality of planes for single-level programming and a fourth set of planes of the plurality of planes for multi-level programming, where, configuring the third set of planes and the fourth set of planes includes allocating, for the second duration based at least in part on the utilization monitor 845 determining that the utilization satisfies the second threshold, the first plane for single-level programming and the second plane, the third plane, and the fourth plane for multi-level programming, where the first set of planes includes the first plane, and the second set of planes includes the second plane, the third plane, and the fourth plane.

In some examples, the resource configuration component 825 may be configured as or otherwise support a means for configuring, for a second duration that follows the first duration, the first set of planes for multi-level programming and the second set of planes for single-level programming. In some examples, the data component 830 may be configured as or otherwise support a means for receiving, from the host device during the second duration, a third set of data. In some examples, the programming component 835 may be configured as or otherwise support a means for writing, during the second duration and in accordance with a second single-level programming operation, the third set of data to a third virtual block that spans the second set of planes. In some examples, the folding component 840 may be configured as or otherwise support a means for transferring, during the second duration and in accordance with a second multi-level programming operation, a fourth set of data from the first set of planes or the second set of planes to a fourth virtual block that spans the first set of planes.

In some examples, a plurality of channels is coupled with the plurality of planes and the controller. In some examples, each channel of the plurality of channels is coupled with a respective set of planes of the plurality of planes.

In some examples, a first channel of the plurality of channels is coupled with a first plane of the plurality of planes and a third plane of the plurality of planes, the first set of planes including the first plane and the second set of planes including the third plane, and a second channel of the plurality of channels is coupled with a second plane of the plurality of planes and a fourth plane of the plurality of planes, the first set of planes including the second plane and the second set of planes including the fourth plane.

In some examples, the data component 830 may be configured as or otherwise support a means for receiving, from the host device during an earlier duration that precedes the first duration, a third set of data and a fourth set of data. In some examples, the programming component 835 may be configured as or otherwise support a means for writing, during the earlier duration and in accordance with a second single-level programming operation, the third set of data to a third virtual block of the first set of planes. In some examples, the programming component 835 may be configured as or otherwise support a means for writing, during the earlier duration and in accordance with a third single-level programming operation, the fourth set of data to a fourth virtual block of the second set of planes.

In some examples, the folding component 840 may be configured as or otherwise support a means for writing, during the earlier duration and in accordance with a second multi-level programming operation, a fifth set of data to a fifth virtual block of the first set of planes or the second set of planes.

In some examples, a die includes the first set of planes and the second set of planes.

In some examples, one or more first dies of a plurality of dies includes one or more planes of the first set of planes and one or more second dies of the plurality of dies includes one or more planes of the second set of planes.

Figure 9:
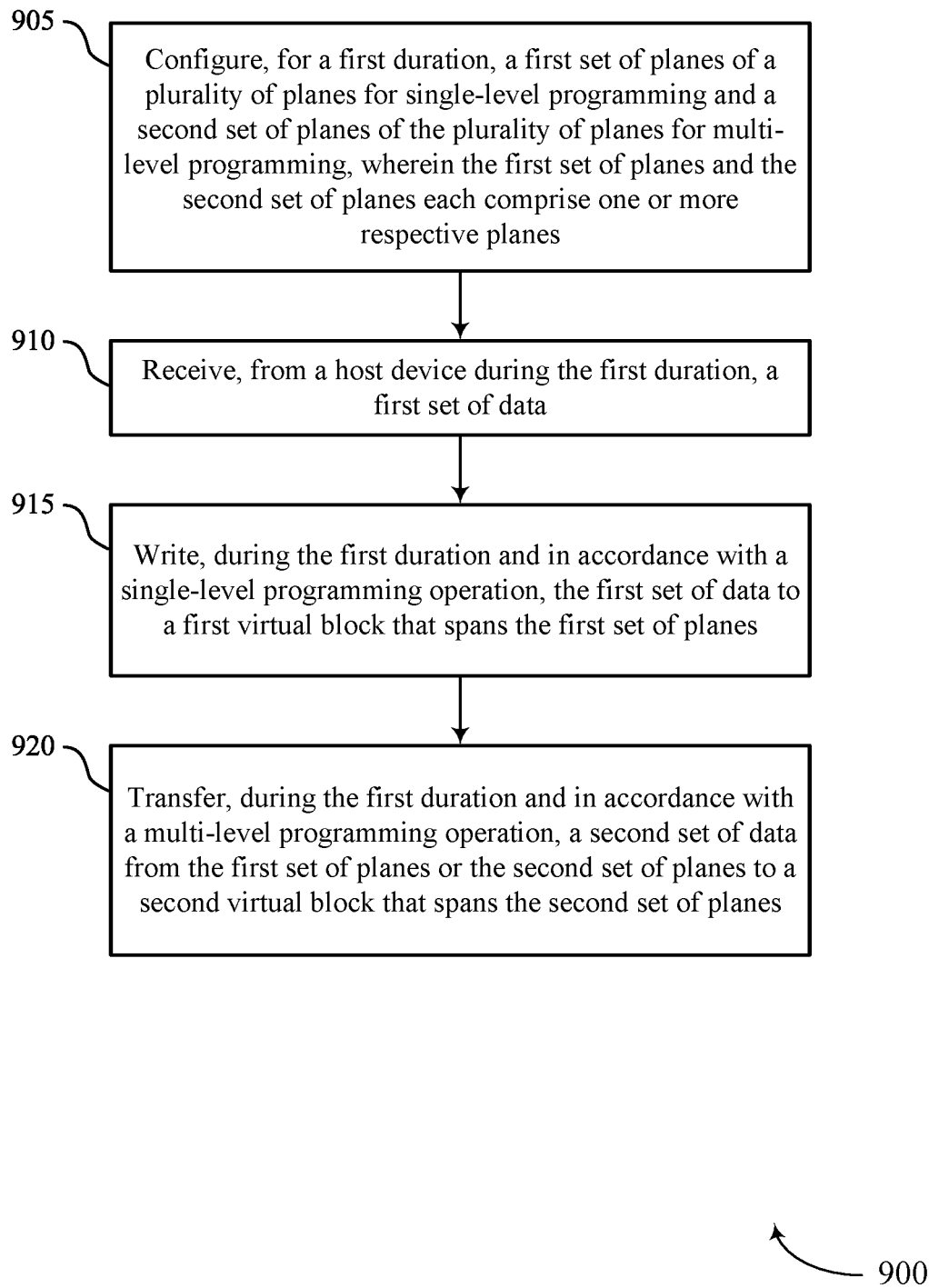
FIG. 9 shows a flowchart illustrating a method or methods that support managing single-level and multi-level programming operations in accordance with examples as disclosed herein.

FIG. 9 shows a flowchart illustrating a method 900 that supports managing single-level and multi-level programming operations in accordance with examples as disclosed herein. The operations of method 900 may be implemented by a memory controller or its components as described herein. For example, the operations of method 900 may be performed by a memory controller as described with reference to FIGS. 1 through 8. In some examples, a memory controller may execute a set of instructions to control the functional elements of the device to perform the described functions. Additionally, or alternatively, the memory controller may perform aspects of the described functions using special-purpose hardware.

At 905, the method may include configuring, for a first duration, a first set of planes of a plurality of planes for single-level programming and a second set of planes of the plurality of planes for multi-level programming, where the first set of planes and the second set of planes each include one or more respective planes. The operations of 905 may be performed in accordance with examples as disclosed herein. In some examples, aspects of the operations of 905 may be performed by a resource configuration component 825 as described with reference to FIG. 8.

At 910, the method may include receiving, from a host device during the first duration, a first set of data. The operations of 910 may be performed in accordance with examples as disclosed herein. In some examples, aspects of the operations of 910 may be performed by a data component 830 as described with reference to FIG. 8.

At 915, the method may include writing, during the first duration and in accordance with a single-level programming operation, the first set of data to a first virtual block that spans the first set of planes. The operations of 915 may be performed in accordance with examples as disclosed herein. In some examples, aspects of the operations of 915 may be performed by a programming component 835 as described with reference to FIG. 8.

At 920, the method may include transferring, during the first duration and in accordance with a multi-level programming operation, a second set of data from the first set of planes or the second set of planes to a second virtual block that spans the second set of planes. The operations of 920 may be performed in accordance with examples as disclosed herein. In some examples, aspects of the operations of 920 may be performed by a folding component 840 as described with reference to FIG. 8.

In some examples, an apparatus as described herein may perform a method or methods, such as the method 900. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for configuring, for a first duration, a first set of planes of a plurality of planes for single-level programming and a second set of planes of the plurality of planes for multi-level programming, where the first set of planes and the second set of planes each include one or more respective planes; receiving, from a host device during the first duration, a first set of data; writing, during the first duration and in accordance with a single-level programming operation, the first set of data to a first virtual block that spans the first set of planes; and transferring, during the first duration and in accordance with a multi-level programming operation, a second set of data from the first set of planes or the second set of planes to a second virtual block that spans the second set of planes.

Aspect 2: The apparatus of aspect 1, further including operations, features, circuitry, logic, means, or instructions, or any combination thereof for a plurality of channels is coupled with the plurality of planes and the controller and each channel of the plurality of channels is coupled with a respective plane of the plurality of planes.

Aspect 3: The apparatus of any of aspects 1 through 2, further including operations, features, circuitry, logic, means, or instructions, or any combination thereof for receiving, from the host device during an earlier duration that precedes the first duration, a third set of data and writing, during the earlier duration and in accordance with a second single-level programming operation, the third set of data to a third virtual block that spans the plurality of planes.

Aspect 4: The apparatus of aspect 3, further including operations, features, circuitry, logic, means, or instructions, or any combination thereof for writing, during the earlier duration and in accordance with a second multi-level programming operation, a fourth set of data to a fourth virtual block that spans the plurality of planes.

Aspect 5: The apparatus of any of aspects 1 through 4, further including operations, features, circuitry, logic, means, or instructions, or any combination thereof for determining whether a utilization of the plurality of planes satisfies a threshold, where configuring the first set of planes for single-level programming and the second set of planes for multi-level programming is based at least in part on determining that the utilization satisfies the threshold.

Aspect 6: The apparatus of aspect 5 where operations, features, circuitry, logic, means, or instructions, or any combination thereof for configuring the first set of planes and the second set of planes, further includes operations, features, circuitry, logic, means, or instructions, or any combination thereof for allocating, for the first duration based at least in part on the utilization satisfying the threshold, a first plane of the plurality of planes and a second plane of the plurality of planes for single-level programming and a third plane of the plurality of planes and a fourth plane of the plurality of planes for multi-level programming, where the first set of planes includes the first plane and the second plane, and the second set of planes includes the third plane and the fourth plane.

Aspect 7: The apparatus of aspect 6, further including operations, features, circuitry, logic, means, or instructions, or any combination thereof for the first virtual block spans the first plane and the second plane of the first set of planes, and the second virtual block spans the third plane and the fourth plane of the second set of planes.

Aspect 8: The apparatus of any of aspects 6 through 7, further including operations, features, circuitry, logic, means, or instructions, or any combination thereof for determining whether the utilization of the plurality of planes satisfies a second threshold that is greater than the threshold and configuring, for a second duration that follows the first duration, a third set of planes of the plurality of planes for single-level programming and a fourth set of planes of the plurality of planes for multi-level programming, where operations, features, circuitry, logic, means, or instructions, or any combination thereof for configuring the third set of planes and the fourth set of planes includes operations, features, circuitry, logic, means, or instructions, or any combination thereof for allocating, for the second duration based at least in part on determining that the utilization satisfies the second threshold, the first plane for single-level programming and the second plane, the third plane, and the fourth plane for multi-level programming, where the first set of planes includes the first plane, and the second set of planes includes the second plane, the third plane, and the fourth plane.

Aspect 9: The apparatus of any of aspects 1 through 8, further including operations, features, circuitry, logic, means, or instructions, or any combination thereof for configuring, for a second duration that follows the first duration, the first set of planes for multi-level programming and the second set of planes for single-level programming; receiving, from the host device during the second duration, a third set of data; writing, during the second duration and in accordance with a second single-level programming operation, the third set of data to a third virtual block that spans the second set of planes; and transferring, during the second duration and in accordance with a second multi-level programming operation, a fourth set of data from the first set of planes or the second set of planes to a fourth virtual block that spans the first set of planes.

Aspect 10: The apparatus of any of aspects 1 through 9, further including operations, features, circuitry, logic, means, or instructions, or any combination thereof for a plurality of channels is coupled with the plurality of planes and the controller and each channel of the plurality of channels is coupled with a respective set of planes of the plurality of planes.

Aspect 11: The apparatus of aspect 10, further including operations, features, circuitry, logic, means, or instructions, or any combination thereof for a first channel of the plurality of channels is coupled with a first plane of the plurality of planes and a third plane of the plurality of planes, the first set of planes including the first plane and the second set of planes including the third plane, and a second channel of the plurality of channels is coupled with a second plane of the plurality of planes and a fourth plane of the plurality of planes, the first set of planes including the second plane and the second set of planes including the fourth plane.

Aspect 12: The apparatus of any of aspects 1 through 11, further including operations, features, circuitry, logic, means, or instructions, or any combination thereof for receiving, from the host device during an earlier duration that precedes the first duration, a third set of data and a fourth set of data; writing, during the earlier duration and in accordance with a second single-level programming operation, the third set of data to a third virtual block of the first set of planes; and writing, during the earlier duration and in accordance with a third single-level programming operation, the fourth set of data to a fourth virtual block of the second set of planes.

Aspect 13: The apparatus of aspect 12, further including operations, features, circuitry, logic, means, or instructions, or any combination thereof for writing, during the earlier duration and in accordance with a second multi-level programming operation, a fifth set of data to a fifth virtual block of the first set of planes or the second set of planes.

Aspect 14: The apparatus of any of aspects 1 through 13, further including operations, features, circuitry, logic, means, or instructions, or any combination thereof for a die includes the first set of planes and the second set of planes.

Aspect 15: The apparatus of any of aspects 1 through 14, further including operations, features, circuitry, logic, means, or instructions, or any combination thereof for one or more first dies of a plurality of dies includes one or more planes of the first set of planes and one or more second dies of the plurality of dies includes one or more planes of the second set of planes.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and a second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
a plurality of planes each comprising memory cells; and
processing circuitry coupled with the plurality of planes and configured to cause the memory system to:
configure, for a first duration based at least in part on a utilization of the plurality of planes satisfying a first threshold, a first set of planes of the plurality of planes for single-level programming and a second set of planes of the plurality of planes for multi-level programming, wherein the first set of planes and the second set of planes each comprise one or more respective planes;
receive, from a host device during the first duration, a first set of data;
write, during the first duration and in accordance with a single-level programming operation, the first set of data to a first virtual block that spans the first set of planes;
transfer, during the first duration and in accordance with a multi-level programming operation, a second set of data from the first set of planes or the second set of planes to a second virtual block that spans the second set of planes; and
configure, for a second duration that follows the first duration, a third set of planes of the plurality of planes for single-level programming and a fourth set of planes of the plurality of planes for multi-level programming based at least in part on the utilization of the plurality of planes satisfying a second threshold.

2. The memory system of claim 1, further comprising:
a plurality of channels coupled with the plurality of planes and the processing circuitry, wherein each channel of the plurality of channels is coupled with a respective plane of the plurality of planes.

3. The memory system of claim 1, wherein the processing circuitry is further configured to cause the memory system to:
receive, from the host device during an earlier duration that precedes the first duration, a third set of data; and
write, during the earlier duration and in accordance with a second single-level programming operation, the third set of data to a third virtual block that spans the plurality of planes.

4. The memory system of claim 3, wherein the processing circuitry is further configured to cause the memory system to:
write, during the earlier duration and in accordance with a second multi-level programming operation, a fourth set of data to a fourth virtual block that spans the plurality of planes.

5. The memory system of claim 1, wherein, to configure the first set of planes and the second set of planes, the processing circuitry is further configured to cause the memory system to:
allocate, for the first duration based at least in part on the utilization satisfying the first threshold, a first plane of the plurality of planes and a second plane of the plurality of planes for single-level programming and a third plane of the plurality of planes and a fourth plane of the plurality of planes for multi-level programming, wherein:
the first set of planes comprises the first plane and the second plane, and
the second set of planes comprises the third plane and the fourth plane.

6. The memory system of claim 5, wherein, to configure the first set of planes and the second set of planes, the processing circuitry is further configured to cause the memory system to:
allocate, for the second duration based at least in part on determining that the utilization satisfies the second threshold, the first plane for single-level programming and the second plane, the third plane, and the fourth plane for multi-level programming, wherein:
the third set of planes comprises the first plane, and
the fourth set of planes comprises the second plane, the third plane, and the fourth plane.

7. The memory system of claim 5, wherein:
the first virtual block spans the first plane and the second plane of the first set of planes, and the second virtual block spans the third plane and the fourth plane of the second set of planes.

8. The memory system of claim 1, wherein the processing circuitry is further configured to cause the memory system to:
receive, from the host device during the second duration, a third set of data;
write, during the second duration and in accordance with a second single-level programming operation, the third set of data to a third virtual block that spans the second set of planes; and
transfer, during the second duration and in accordance with a second multi-level programming operation, a fourth set of data from the first set of planes or the second set of planes to a fourth virtual block that spans the first set of planes.

9. The memory system of claim 1, further comprising:
a plurality of channels coupled with the plurality of planes and the processing circuitry, wherein each channel of the plurality of channels is coupled with a respective set of planes of the plurality of planes.

10. The memory system of claim 9, wherein:
a first channel of the plurality of channels is coupled with a first plane of the plurality of planes and a third plane of the plurality of planes, the first set of planes comprising the first plane and the second set of planes comprising the third plane, and
a second channel of the plurality of channels is coupled with a second plane of the plurality of planes and a fourth plane of the plurality of planes, the first set of planes comprising the second plane and the second set of planes comprising the fourth plane.

11. The memory system of claim 1, wherein the processing circuitry is further configured to cause the memory system to:
receive, from the host device during an earlier duration that precedes the first duration, a third set of data and a fourth set of data;
write, during the earlier duration and in accordance with a second single-level programming operation, the third set of data to a third virtual block of the first set of planes; and
write, during the earlier duration and in accordance with a third single-level programming operation, the fourth set of data to a fourth virtual block of the second set of planes.

12. The memory system of claim 11, wherein the processing circuitry is further configured to cause the memory system to:
write, during the earlier duration and in accordance with a second multi-level programming operation, a fifth set of data to a fifth virtual block of the first set of planes or the second set of planes.

13. The memory system of claim 1, further comprising:
a die that comprises the first set of planes and the second set of planes.

14. The memory system of claim 1, further comprising:
a plurality of dies, wherein one or more first dies of the plurality of dies comprises one or more planes of the first set of planes and one or more second dies of the plurality of dies comprises one or more planes of the second set of planes.

15. A memory system, comprising
a plurality of planes each comprising memory cells; and
processing circuitry coupled with the plurality of planes and configured to cause the memory system to:
determine whether a utilization of the plurality of planes satisfies a first threshold;
configure, for a first duration and based at least in part on determining that the utilization of the plurality of planes satisfies the first threshold, a first set of planes of the plurality of planes for single-level programming and a second set of planes of the plurality of planes for multi-level programming, wherein the first set of planes and the second set of planes each comprise one or more respective planes, and wherein, to configure the first set of planes and the second set of planes, the processing circuitry is further configured to cause the memory system to:
allocate, for the first duration based at least in part on the utilization satisfying the first threshold, a first plane of the plurality of planes and a second plane of the plurality of planes for single-level programming and a third plane of the plurality of planes and a fourth plane of the plurality of planes for multi-level programming, wherein:
the first set of planes comprises the first plane and the second plane, and
the second set of planes comprises the third plane and the fourth plane;
receive, from a host device during the first duration, a first set of data;
write, during the first duration and in accordance with a single-level programming operation, the first set of data to a first virtual block that spans the first set of planes;
transfer, during the first duration and in accordance with a multi-level programming operation, a second set of data from the first set of planes or the second set of planes to a second virtual block that spans the second set of planes;
determine whether the utilization of the plurality of planes satisfies a second threshold that is greater than the first threshold; and
configure, for a second duration that follows the first duration, a third set of planes of the plurality of planes for single-level programming and a fourth set of planes of the plurality of planes for multi-level programming, wherein, to configure the third set of planes and the fourth set of planes, the processing circuitry is further configured to cause the memory system to:
allocate, for the second duration based at least in part on determining that the utilization satisfies the second threshold, the first plane for single-level programming and the second plane, the third plane, and the fourth plane for multi-level programming, wherein:
the third set of planes comprises the first plane, and
the fourth set of planes comprises the second plane, the third plane, and the fourth plane.

16. A non-transitory, computer-readable medium storing code, comprising instructions which, when executed by one or more processors of an electronic device, cause the electronic device to:
configure, for a first duration based at least in part on a utilization of a plurality of planes satisfying a first threshold, a first set of planes of the plurality of planes for single-level programming and a second set of planes of the plurality of planes for multi-level programming, wherein the first set of planes and the second set of planes each comprise one or more respective planes; and receive, from a host device during the first duration, a first set of data;

write, during the first duration and in accordance with a single-level programming operation, the first set of data to a first virtual block that spans the first set of planes;

transfer, during the first duration and in accordance with a multi-level programming operation, a second set of data from the first set of planes or the second set of planes to a second virtual block that spans the second set of planes; and configure, for a second duration that follows the first duration, a third set of planes of the plurality of planes for single-level programming and a fourth set of planes of the plurality of planes for multi-level programming based at least in part on the utilization of the plurality of planes satisfying a second threshold.

17. The non-transitory, computer-readable medium of claim 16, wherein the instructions, when executed by the one or more processors of the electronic device, further cause the electronic device to:

receive, from the host device during an earlier duration that precedes the first duration, a third set of data; and write, during the earlier duration and in accordance with a second single-level programming operation, the third set of data to a third virtual block that spans the plurality of planes.

18. The non-transitory, computer-readable medium of claim 17, wherein the instructions, when executed by the one or more processors of the electronic device, further cause the electronic device to:

write, during the earlier duration and in accordance with a second multi-level programming operation, a fourth set of data to a fourth virtual block that spans the plurality of planes.

19. A method, comprising:

configuring, for a first duration based at least in part on a utilization of a plurality of planes satisfying a first threshold, a first set of planes of the plurality of planes for single-level programming and a second set of planes of the plurality of planes for multi-level programming, wherein the first set of planes and the second set of planes each comprise one or more respective planes;

receiving, from a host device during the first duration, a first set of data;

writing, during the first duration and in accordance with a single-level programming operation, the first set of data to a first virtual block that spans the first set of planes;

transferring, during the first duration and in accordance with a multi-level programming operation, a second set of data from the first set of planes or the second set of planes to a second virtual block that spans the second set of planes; and configuring, for a second duration that follows the first duration, a third set of planes of the plurality of planes for single-level programming and a fourth set of planes of the plurality of planes for multi-level programming based at least in part on the utilization of the plurality of planes satisfying a second threshold.

20. The method of claim 19, further comprising:

receiving, from the host device during an earlier duration that precedes the first duration, a third set of data; and writing, during the earlier duration and in accordance with a second single-level programming operation, the third set of data to a third virtual block that spans the plurality of planes.

\* \* \* \* \*